(12) United States Patent
Townsend

(10) Patent No.: US 6,589,108 B2
(45) Date of Patent: Jul. 8, 2003

(54) TAPERED BLADE AND HOLDER FOR A MEAT SKINNING MACHINE

(75) Inventor: Ray T. Townsend, Des Moines, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/877,762

(22) Filed: Jun. 8, 2001

(65) Prior Publication Data

US 2002/0187738 A1 Dec. 12, 2002

(51) Int. Cl.$^7$ ................................................. A22B 5/16
(52) U.S. Cl. ......................................................... 452/125
(58) Field of Search ................................ 452/125, 130, 452/127, 129, 104, 105, 133; 30/229, 346; 225/91, 56

(56) References Cited

U.S. PATENT DOCUMENTS

| | | | |
|---|---|---|---|
| 358,234 A | * 2/1887 | Vache | ..................... 15/236.01 |
| 3,513,893 A | 5/1970 | Townsend | |
| 4,466,344 A | 8/1984 | Schill | |
| 4,730,376 A | 3/1988 | Yamada | |
| 4,817,284 A | * 4/1989 | Sacherman et al. | ........... 30/329 |
| 5,083,973 A | 1/1992 | Townsend | |
| 5,211,097 A | 5/1993 | Grasselli | |
| 5,350,334 A | 9/1994 | Holms | |
| 5,660,218 A | 8/1997 | Jonkka | |
| 5,738,156 A | 4/1998 | Stewart | |
| 6,030,326 A | 2/2000 | Azuma et al. | |

OTHER PUBLICATIONS

U.S. patent application Ser. No. 09/855,928, Hamblin, filed May 15, 2001.
U.S. patent application Ser. No. 09/777,759, Wonderlich et al., filed Feb. 6, 2001.

* cited by examiner

*Primary Examiner*—Charles T. Jordan
*Assistant Examiner*—Susan C. Alimenti

(57) ABSTRACT

The bottom of the clamp in a blade assembly has an elongated truncated tapered recess that receives the blade of similar shape. The blade has a vertical rearward edge. When the blade is placed in the recess of the clamp, an opening exists between the rearward edge of the blade and the rearward wall of the recess. To remove the blade an ice pick or similar tool is inserted in the space in the recess between the rearward edge of the blade and the vertical wall at the rearward end of the recess to pry the blade out of the recess.

3 Claims, 7 Drawing Sheets

TAPERED BLADE AND HOLDER FOR A MEAT SKINNING MACHINE

BACKGROUND OF THE INVENTION

The present invention is directed to a skinning blade assembly and more particularly to a skinning blade assembly with a tapered blade and holder.

Skinning blade assemblies are well known in the art and generally comprise an elongated skinning blade with a clamp to hold the blade in place which is mounted on a shoe. With use, the cutting edge of the blade can become worn, dull, or clogged requiring removal and/or cleaning of the blade. Presently, removal of the blade requires a technician to disassemble the skinning assembly by removing the clamp from the shoe which disengages the blade that is secured between the two. The process is time consuming requiring not only excessive manpower, but also shut down time of the skinning machine resulting in lost productivity.

Therefore, a principal objective of the present invention is to provide a skinning blade assembly with a tapered blade that can easily be removed and replaced.

BRIEF SUMMARY OF THE INVENTION

The skinning blade assembly has an elongated tapered blade, a clamp which receives the blade, and a shoe upon which the clamp is mounted. The clamp has a top, two sides, two ends, and a bottom. The bottom of the clamp has an elongated truncated tapered recess that receives the blade.

The blade has a forward serrated cutting edge, a rearward edge, two ends, a top and a bottom. The blade has a tapered truncated body portion that terminates in a vertical rearward edge that is complementary in shape to at least a part of the recess in the clamp. When the blade is placed in the recess of the clamp, the tapered portion of the blade engages the recess in the clamp and the bottom of the blade engages the shoe leaving an opening or space between the blade, the rearward end of the blade and the rearward wall of the recess. The force of oncoming meat products hold the blade in the recess during operation. To remove the blade an ice pick or similar tool is inserted in the space in the recess between the rearward edge of the blade and the vertical wall at the rearward end of the recess. Sufficient force is then applied by the tool to the rearward edge of the blade to push the blade out of the recess.

An alternate form of the invention uses a flat blade and a tapered wedge to serve the same functions as described above.

DESCRIPTION OF THE PREFERRED EMBODIMENT OF THE INVENTION

Figure 1:
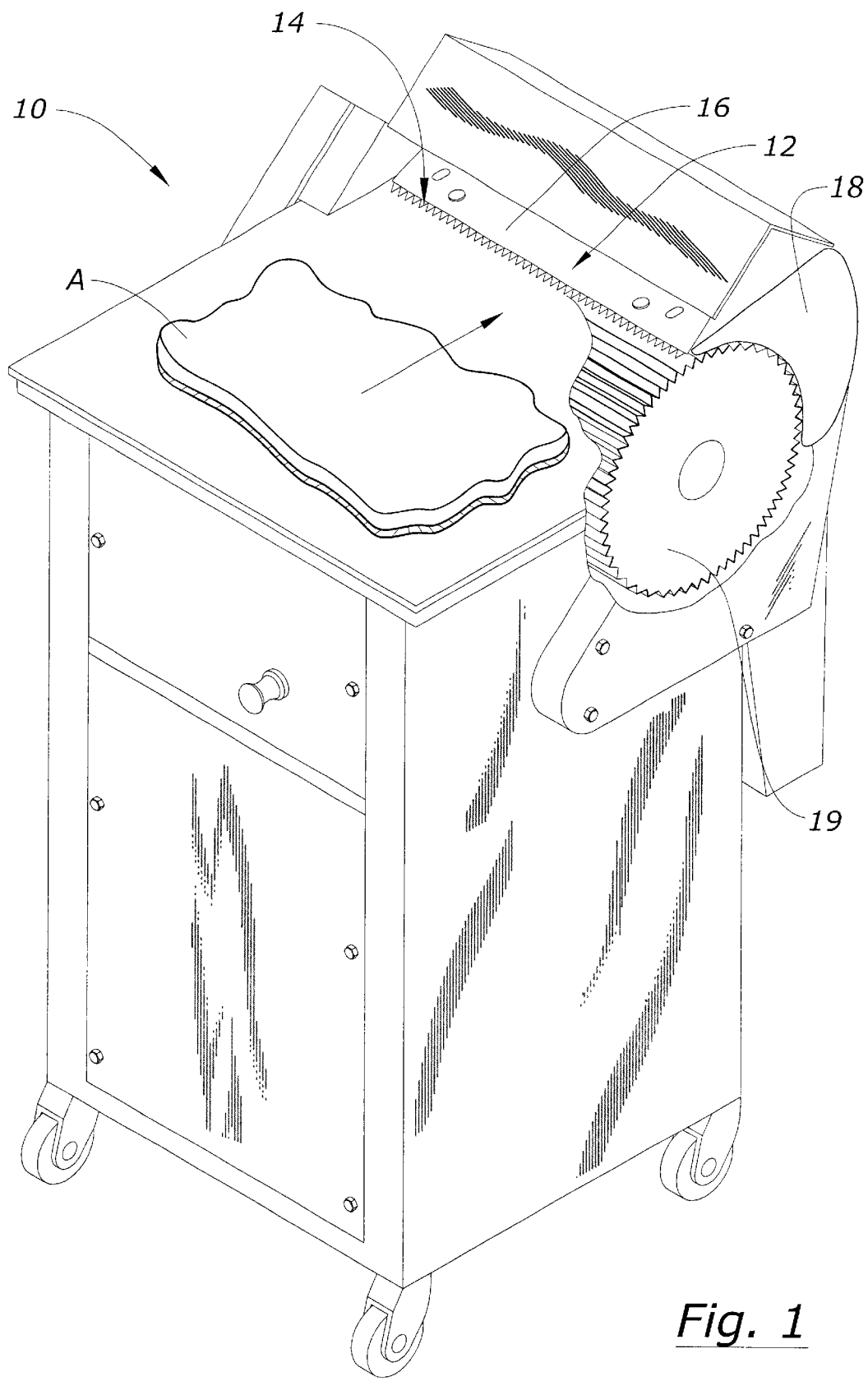
FIG. 1 is a perspective view of a skinning machine with the skinning assembly of this invention.
Figure 2:
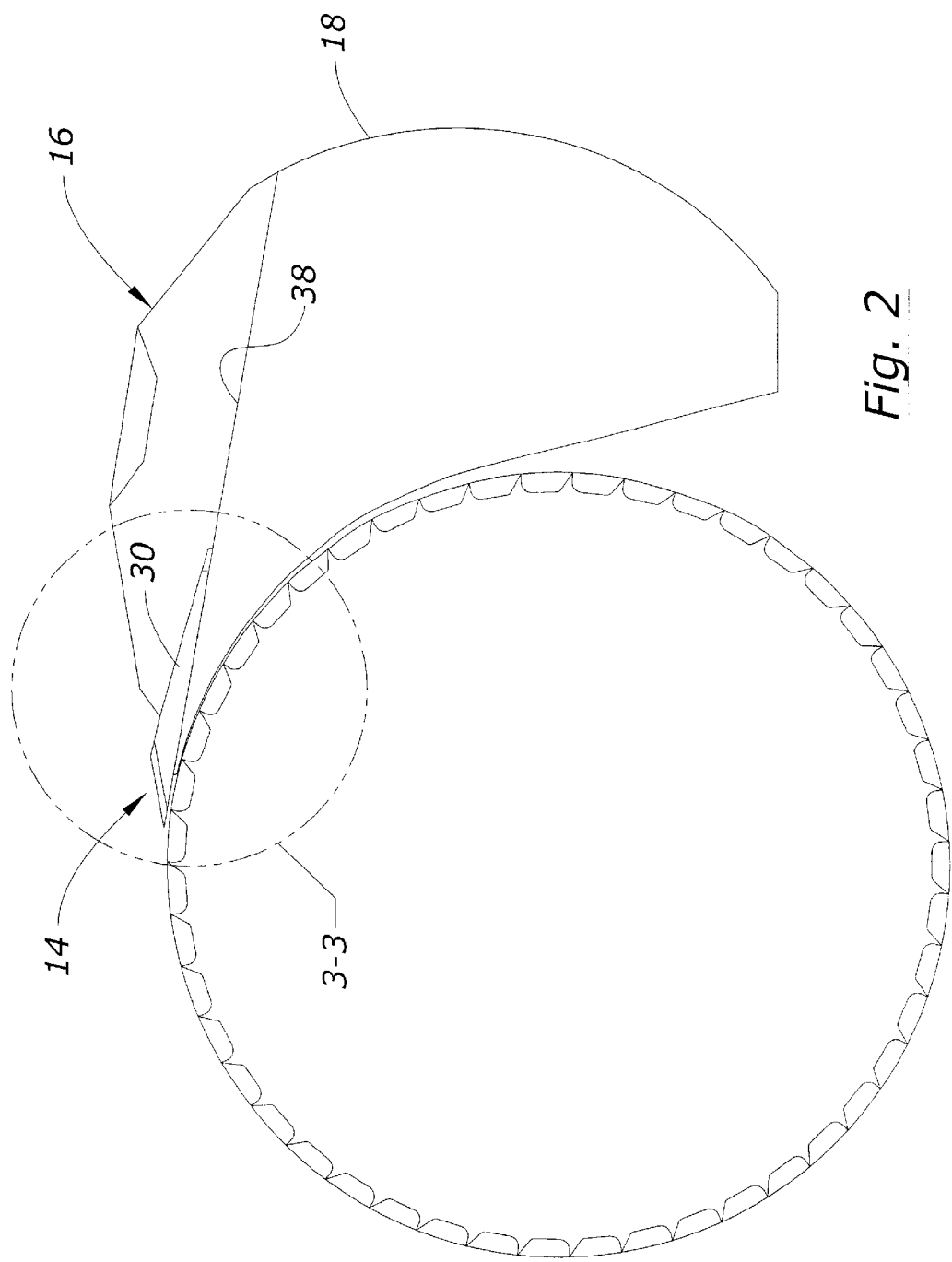
FIG. 2 is an end elevational view of the skinning blade assembly of this invention.

With reference to FIG. 1, the numeral 10 generally refers to a skinning machine and the numeral 12 designates the skinning blade assembly of this invention which includes an elongated serrated skinning blade 14, a clamp 16, and a shoe 18, and a gripper roll 19.

Figure 3:
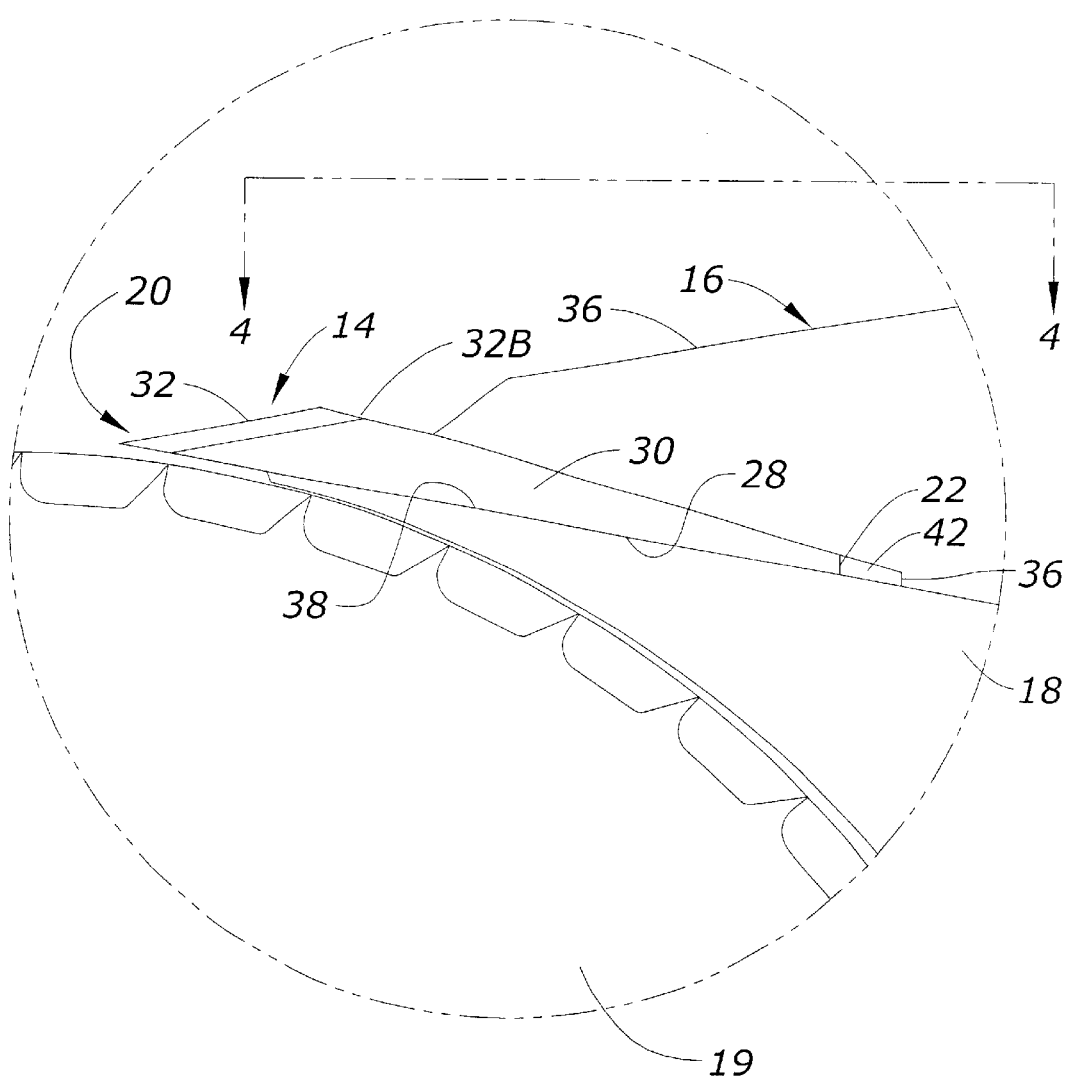
FIG. 3 is an enlarged scale elevational view taken on line 3—3 of FIG. 2.
Figure 4:
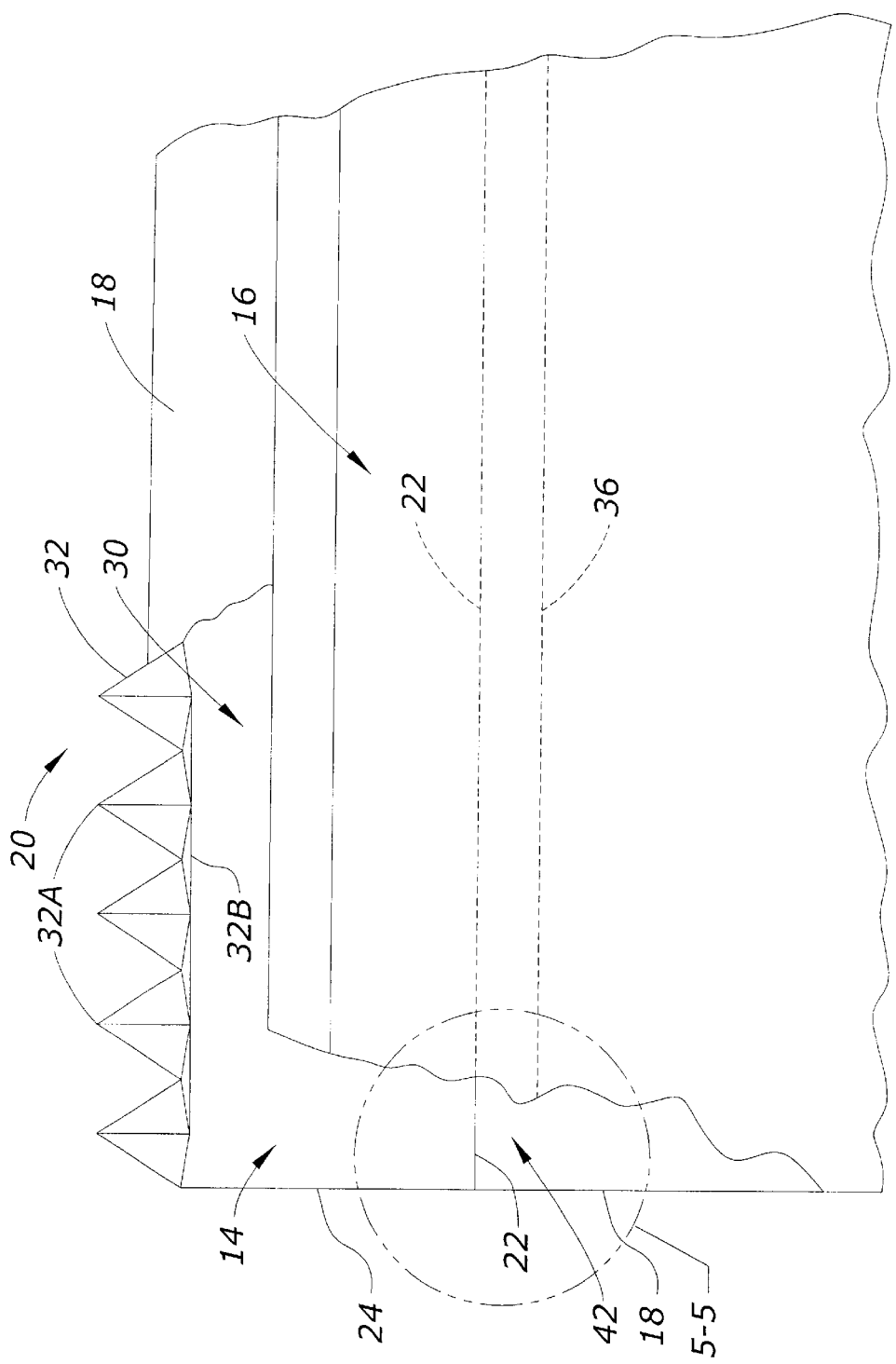
FIG. 4 is a large scale plan view taken on line 4—4 of FIG. 3.

The skinning blade 14 has a serrated cutting edge 20, (FIG. 4), comprised of pointed inclined serrated teeth 32, a rearward edge 22, two ends 24, and a flat planar bottom 28. (FIG. 3). The body 30 of the blade 14 has a rearwardly truncated tapered body 30 that terminates in the rearward edge 22.

The cutting edge 20 is comprised of a plurality of serrated teeth 32 (FIG. 4) which taper upwardly and rearwardly from sharp points 32A to the upper forward edge 32B of body 30.

Figure 3A:
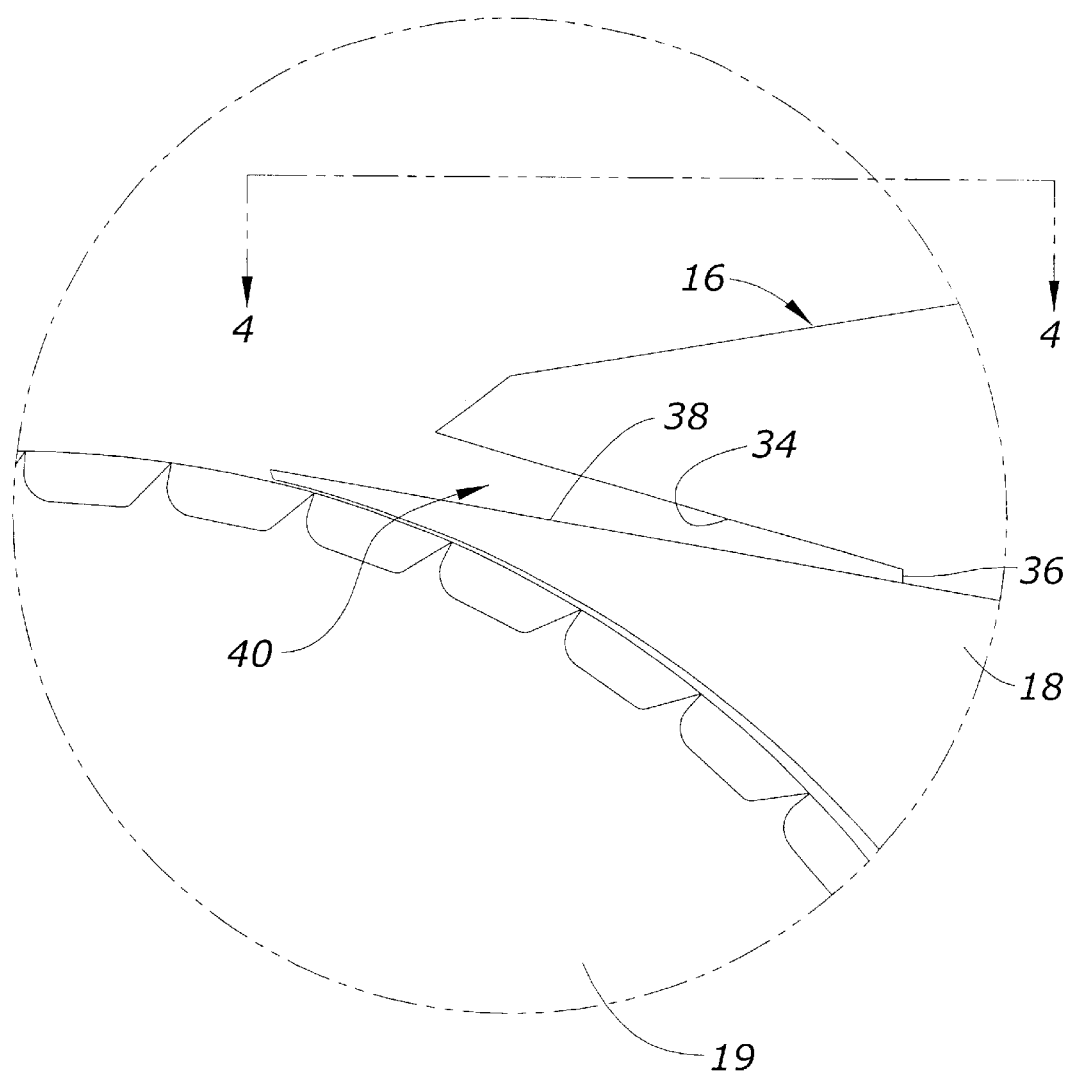
FIG. 3A is a view similar to that of FIG. 3 but with the cutting blade removed.

The clamp 16 has a tapered under-cut surface 34 which extends downwardly and rearwardly and terminates in a vertical wall 36. The clamp 16 rests on the upper surface 38 of shoe 18. The portion of surface 38 underneath surface 34 of shoe 18 forms a truncated tapered recess 40 (FIG. 3A).

With reference to FIG. 3, the flat upper surface of body 30 of blade 14 tapers downwardly and rearwardly from its upper forward edge 32B to its rearward vertical edge 22. This truncated tapered portion of the body 30 is complimentary in shape to the recess 40, except that the rearward edge 22 of the blade does not extend all the way to vertical wall 36 of recess 40, so as to create a space 42 between the rearward edge 22 of the blade and the wall 36 of recess 40.

When the blade 14 is wedged in to the recess 40 as shown in FIG. 3, the force of the incoming meat product A (FIG. 1) upon the cutting edge 20 of the blade is sufficient to hold the blade in place during the skinning operation.

Figure 5:
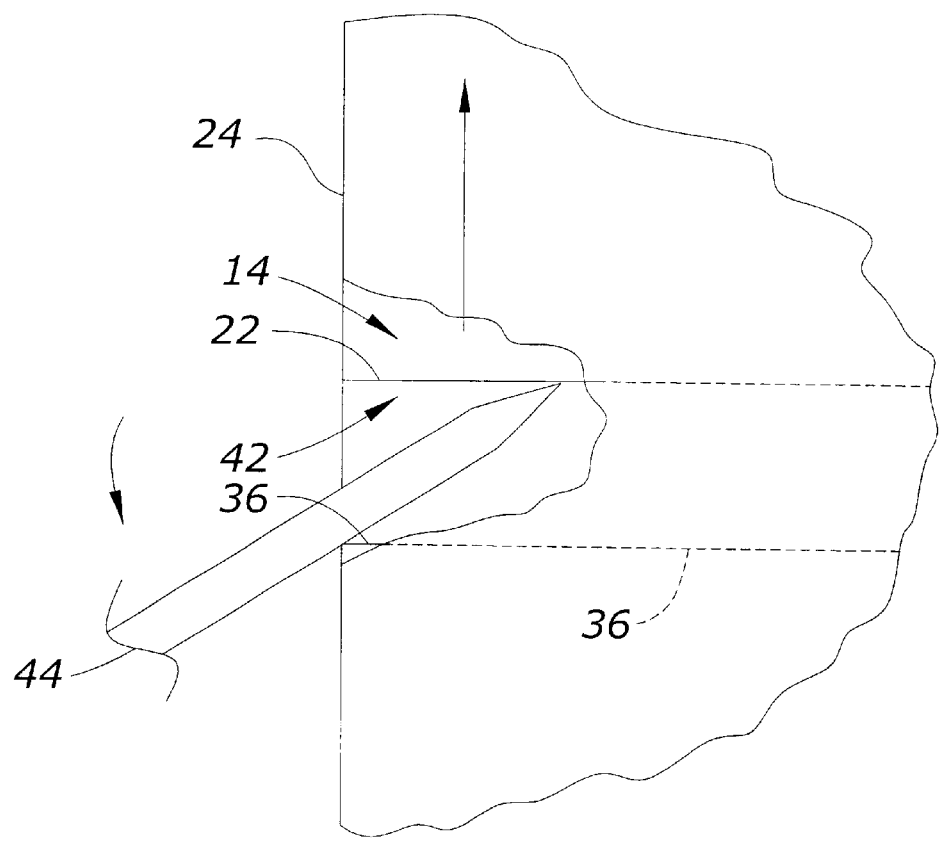
FIG. 5 is a modified view taken on line 5—5 of FIG. 4.

To remove blade 14 from recess 40, an ice pick 44 or the like is extended into space or opening 42 to pry the blade 14 forwardly out of recess 40 (see FIG. 5). The rearward vertical wall 36 of the recess 40 is used as the fulcrum as the tip 48 of the pick 44 engages the rearward edge 22 to pry the blade 44 forwardly and outwardly from the recess 40. When one end of blade 14 is moved forwardly out of recess 40, the operator can then safely grasp the blade and can completely remove the blade from the recess.

Figure 6:
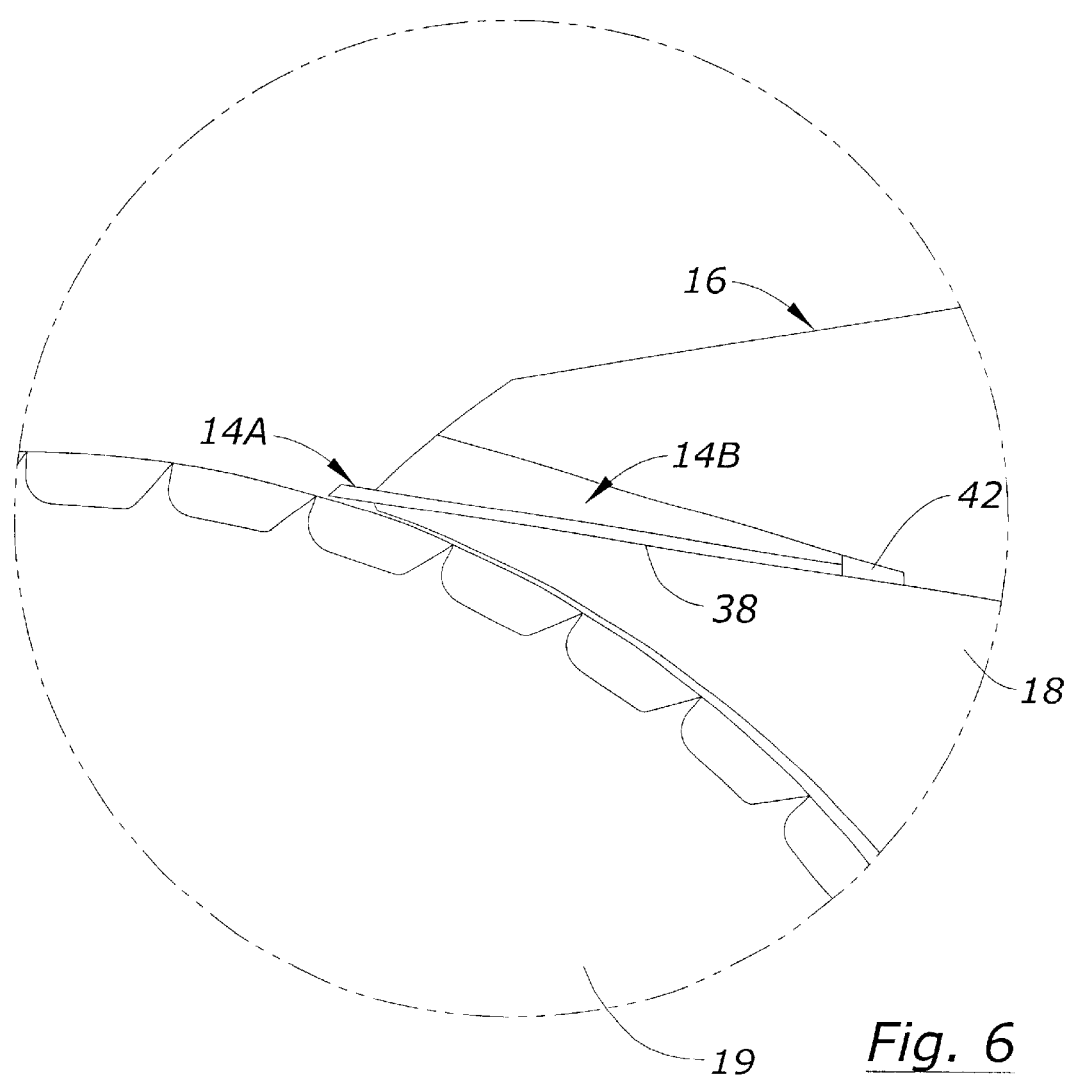
FIG. 6 is an alternate form of the invention taken from the same vantage point as in FIG. 3.

An alternate form of the invention is shown in FIG. 6 where a flat blade 14A is used in place of blade 14. A tapered wedge 48 is inserted into recess 40 above blade 14A to serve the same purpose of the tapered portion of body 30 of blade 14. The removal process for blade 14A and wedge 48 is the same as for blade 14.

The opening 42 between the rearward edge 22 of blade 14 and the vertical rear end 36 of recess 40 does not need to run the full length of blade 14. Rather, a notch (not shown) in one end of blade 14 adjacent its rearward edge would create a space 42 for the same purpose.

It is therefore seen that this invention will accomplish at least all of its stated objectives.

What is claimed is:

1. A skinning blade assembly, comprising, a shoe support having an upper substantially flat support surface and a forward edge, a clamp having a forward edge and a bottom flat surface portion engaging and superimposed over the flat support surface of the shoe support, the clamp having a tapered slot extending from its forward edge downwardly and rearwardly towards its flat support surface and terminating in an elongated vertical wall, said slot forming a truncated tapered recess with respect to the flat support surface of the shoe adjacent its forward edge, an elongated blade having an elongated forward cutting edge, a rearward edge, and a tapered truncated body compatible with the shape of at least a portion of the tapered recess, whereby the blade will be permitted only partial penetration of the recess so as to create a space with open ends forwardly of the vertical wall to permit an elongated tool to be inserted therein to pry the blade forwardly out of the tapered truncated recess using the vertical wall as a fulcrum for the tool during the prying operations.

2. A skinning blade assembly, comprising, a shoe support having an upper substantially flat support surface and a forward edge, a clamp having a forward edge and a bottom flat surface portion engaging and superimposed over the flat support surface of the shoe support, the clamp having a tapered slot extending from its forward edge downwardly and rearwardly towards its flat support surface and terminating in an elongated vertical wall, said slot forming a truncated tapered recess with respect to the flat support surface of the shoe adjacent its forward edge, an elongated blade having an elongated forward cutting edge, and a rearward edge extending into the recess, and a tapered body portion extending into the recess in conjunction with the blade to releasably wedge the blade within the recess, and an opening located adjacent one end of the blade and the vertical wall to permit an elongated tool to be inserted therein to pry the blade forwardly out of the tapered truncated recess using the vertical wall as a fulcrum for the tool during the prying operations.

3. The assembly of claim 2 wherein the body portion is a tapered wedge, and the blade is flat, with the wedge serving to clamp the blade within the recess.

* * * * *